United States Patent [19]

Todd

[11] 4,045,608
[45] Aug. 30, 1977

[54] FRICTION FACING WITH POROUS SHEET BASE

[76] Inventor: Robert A. Todd, 187 Mountain Ave., North Caldwell, N.J. 07006

[21] Appl. No.: 694,349

[22] Filed: June 9, 1976

Related U.S. Application Data

[63] Continuation-in-part of Ser. No. 508,090, Sept. 23, 1974, abandoned.

[51] Int. Cl.² .................... B32B 15/06; B32B 15/08; B32B 15/12
[52] U.S. Cl. .................................. 428/251; 428/65; 428/293; 428/361; 428/390; 428/391; 428/262; 428/450; 428/451; 428/496; 428/448; 428/452; 428/514; 428/539; 427/340; 427/372 R; 427/290; 156/278; 428/444; 428/445
[58] Field of Search .............. 428/65, 293, 361, 390, 428/391, 514, 539, 251, 496, 262, 450, 451, 444, 452, 448, 445; 427/340, 372, 290; 156/278

[56] References Cited

U.S. PATENT DOCUMENTS

| | | | |
|---|---|---|---|
| 2,849,346 | 8/1958 | Almen et al. | 156/278 X |
| 2,855,329 | 10/1958 | Morton | 427/372 |
| 2,901,467 | 8/1959 | Croco | 260/77.5 |
| 3,316,138 | 4/1967 | Taylor | 428/65 X |
| 3,927,241 | 12/1975 | Augustin | 428/65 X |

Primary Examiner—P. C. Ives
Attorney, Agent, or Firm—Edward R. Weingram

[57] ABSTRACT

Porous friction facing materials containing cellulose fibers are coated with an impregnant of ethyl silicate to provide automatic transmission clutch plate and band linings of improved frictional properties, durability, wear and heat resistance, without use of asbestos. A sheet of paper-like fibrous material may be first impregnated with a phenolic resin binder which is cured to form a first coating and then impregnated with a hydrolyzed solution of ethyl silicate in a solvent. The material is further heated to drive off the solvent and cure the ethyl silicate to form a second outer coating having a higher coefficient of friction than the first coating. The silicate impregnated lining is then bonded to the steel plate or band. Alternatively, the resin impregnated lining material may be first bonded to the metal plate and then the entire plate assembly is impregnated with the ethyl silicate solution and cured.

13 Claims, 2 Drawing Figures

FRICTION FACING WITH POROUS SHEET BASE

The present application is a continuation-in-part of Application Ser. No. 508,090, filed Sept. 23, 1974, and now abandoned.

BACKGROUND OF THE INVENTION

1. Field of the Invention

The present invention is directed to an improved friction material such as used for automatic transmission clutch plates and bands and particularly to a novel impregnant which provides improved frictional properties, durability, wear and heat resistance, and permits the elimination of asbestos.

2. Description of the Prior Art

Previous friction linings of porous paper-like oil absorbent materials have been used for automatic transmission clutch plates and bands, oil brakes and steering clutches operating in a fluid environment. These linings generally include some asbestos fibers which have good heat resistance and frictional properties. The materials were also generally impregnated with an outer coating of phenolic resin which bonded the fibers together to form a strong hard lining with good wear resistance. The resin, however, reduces the frictional properties and porosity required for proper operation in a transmission fluid. Some clutch plates require grinding down of the resin coating to provide the necessary friction surfaces. The durability of transmission bands, which must withstand rapid reversals, has also been inadequate.

Examples of such prior art materials and processes are found in U.S. Pat. No. 2,819,987, issued Jan. 14, 1958, wherein one of the inventors is the same as in the instant application, and U.S. Pat. No. 2,855,329, issued Oct. 7, 1958. The latter patent mentions the use of ethyl silicate, which has desirable heat resistance and frictional properties, to impregnate a base material of asbestos. The silica is dispersed throughout the base material and is then further impregnated with a bonding resin. This later resin impregnation, however, reduces the desired porosity and counteracts the frictional properties of the silica. In addition, asbestos has recently been found to be harmful as an environmental pollutant and efforts are being made to eliminate its use where possible.

SUMMARY OF THE INVENTION

It is therefore the primary object of the present invention to provide a porous friction lining material of improved frictional properties, durability, wear and heat resistance, which does not require the use of asbestos.

This is accomplished by use of a paper-like porous base composition including cellulose fibers and other materials impregnated with ethyl silicate. The fibrous composition is first impregnated and bonded with a phenolic resin which is cured to provide a first coating and then further impregnated with a hydrolyzed solution of ethyl silicate in a solvent such as denatured alcohol. The material is heated to drive off the solvent and further cured to provide a second outer coating having a higher coefficient of friction than the first coating. The lining may be bonded to the metal clutch plate or band and then impregnated with the ethyl silicate, or first impregnated and then bonded to the plate. Use of ethyl silicate as a binder impregnant for the paper-like composition provides the desired frictional properties, durability, wear and heat resistance, which permits the elimination of undesired asbestos fibers. The invention will be more fully understood and other objects and advantages will become apparent from the following description in conjunction with the accompanying drawings.

DESCRIPTION OF THE PREFERRED EMBODIMENTS

Figure 1:
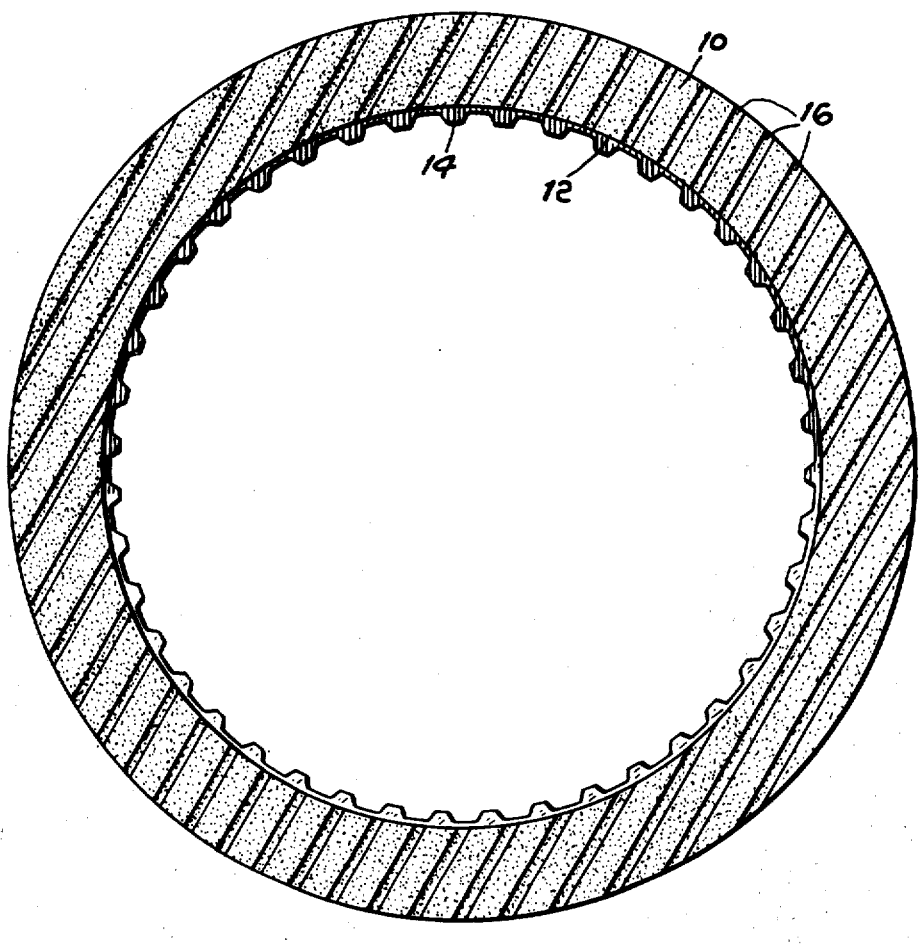
FIGS. 1 and 2 show top and side views of a typical clutch plate having a lining of friction material in accordance with the present invention.
Figure 2:

Linings of frictional material 10, as shown in FIGS. 1 and 2, are used on steel clutch plates 12 or bands of automatic transmissions, or in wet brake and steering clutch devices. The plates may be rotatable on splined shafts of the transmission and have teeth 14 which engage the shaft. Grooves 16 may be formed in the lining to provide cooling and improved friction properties, as will be described later. The lining material must be porous and absorbent to operate in a transmission fluid or oil environment and requires good heat and wear resistance, durability, and frictional properties. Such characteristics have been found in a particular paper-like composition including cellulose fibers, an inorganic absorbent filler, a heat resistant friction modifying agent, and a retention agent, forming a base material which is impregnated with a first coating of a phenolic resin binder and further impregnated with a second outer coating of ethyl silicate.

The fibrous friction materials are formed in sheets or rolls on standard paper mill machines. The thickness of the sheets varies depending upon the end use and typically is in the range of form 0.010 to 0.090 inches.

Examples of suitable base fibrous friction lining compositions formed of commercially available materials are as follows:

1.
   45% ± 10% Mercerized Kraft
   17% ± 5% Diatomaceous Earth
   10% ± 5% Black Iron Oxide
   20% ± 5% Mica Flake
   8% ± 5% Nitrile Latex 2.
   25% ± 5% Kraft (bleached or unbleached)
   25% ± 5% Cotton Linters
   12% ± 2% Diatomaceous Earth
   25% ± 5% Mica Flake
   3% ± 1% Carbon Black
   10% ± 2% Nitrile Latex 3.
   30% ± 5% Mercerized Kraft
   20% ± 5% Diatomaceous Earth
   10% ± 2% Black Iron Oxide
   25% ± 5% Mica Flake
   5% ± 2% Glass Fiber
   10% ± 2% Nitrile Latex The kraft materials and cotton linters furnish the necessary porous cellulose fiber of high strength and desired degree of softness, the earth material provides an oil absorbent filler having desired frictional properties, the iron oxide is a friction modifying agent having desirable heat resistance and friction, as does the mica flake, while the nitrile latex is a synthetic rubber retention agent which holds the fines and pigments in a matrix or sheet and provides added wet strength for the paper mill operation.

Other retention agents which may be used in place of the rubber include 1 to 10% of paper makers alum, 3 to 5% of melamine formaldehyde, 0.3 to 1% of Lufax 295, which is a high polymer thixotropic agent made by Rohm and Haas Chemical Company, 0.5 to 1.5% of poly acrylamide resin and 0.5 to 1.5% of polyamide resin. The retention agents are basically cationic in nature and are attracted to the fibers which are anionic. The percentages of the other materials forming the base would vary to some extent, as in the following examples:

4.
  50% ± 10% Mercerized Kraft
  19% ± 5% Diatomaceous Earth
  10% ± 5% Black Iron Oxide
  20% ± 5% Mica Flake
  1% ± 5% Poly Acrylamide Resin 5.
  30% ± 5% Kraft
  30% ± 5% Cotton Linters
  12% ± 2% Diatomaceous Earth
  24% ± 5% Mica Flakes
  3% ± 1% Carbon Black
  1% ± 0.5% Polyamide Resin Small amounts of from 2–7% of other friction modifying agents, such as chrome oxide, carbon black, or glass fiber may be included, all of which have good heat resistance, with the glass fiber also contributing porosity. Fullers earth may also be used in place of diatomaceous earth as a mineral filler.

All of the above examples have excluded asbestos, which has been a commonly used friction material with good heat resistance, but which is now preferably being eliminated as a health hazard. If desired, however, asbestos can be included in the base material, as in the following example. The red iron oxide is also used for its desirable heat resistance and friction properties.

6.
  45% ± 10% Cotton Linters
  7% ± 2% Asbestos
  25% ± 5% Diatomaceous Earth
  13% ± 2% Red Iron Oxide
  10% ± 2% Nitrile Latex In some light duty applications it is also possible to leave out the friction modifying agents and retention agents, so that a basic composition may include only 80% kraft and 20% diatomaceous earth, which are impregnated with the phenolic resin and ethyl silicate coatings.

The finished sheet of porous paper-like base material is first impregnated with a suitable phenolic resin binder such as a phenol formaldehyde, in a standard dip process which adds from 10–40% weight of cured resin solids to the base material. The resin binds and strengthens the porous mass. The impregnated sheet is heated to about 300° to 350° F and dried to fully cure the resin. The amount of resin added depends upon the end use of the friction material, with larger amounts increasing the hardness and wear but reducing the friction. Too much resin will also reduce the porosity required for operation in a fluid environment. In the past, in some applications, the resin coating would be partially ground off to provide improved friction characteristics.

The sheets or rolls of resin impregnated material are then die to the desired ring shapes for the clutch or band facings, and prepared for the second impregnation with ethyl silicate. If desired, the entire sheet or roll or material may be dip impregnated in the silicate solution and later cut and bonded to the metal plates, may be impregnated after being cut, or may be cut and bonded to the metal plates and then impregnated.

The preferred impregnating solution contains a mixture of from about 15% to 40% ethyl silicate in a solvent of from 60 to 85% denatured ethyl alcohol, with the mixture being prehydrolyzed with dilute hydrochloric acid (1% by weight H Cl in water). Other suitable solvents such as acetone or isopropyl alcohol may also be used. The term ethyl silicate or hydrolyzed ethyl silicate is used to cover several grades of materials including ethyl silicate 40 and condensed ethyl silicate which contain polymeric esters, tetraethyl orthosilicate, and ethyl silicates P-18 and P-20, all of which are available from the Union Carbide Co. The particular ethyl silicate used may be selected in accordance with the silica content which varies with the different grades.

The paper-like resin impregnated sheet is immersed in the hydrolyzed solution of ethyl silicate to thoroughly impregnate the porous material. The impregnated sheet is then heated gradually for 15 to 20 minutes to about 200° F in a forced air oven to drive off the solvent and then further cured at a temperature of up to 300° F. The cured impregnated sheet should contain from 5 to 50% added weight of deposited silica, again depending upon the application. The ethyl silicate provides high temperature resistant and friction properties to the cellulose fiber base composition which permits the elimination of asbestos. The added ethyl silicate coating over the resin also counteracts the loss of friction due to the resin coating and increases durability. The outer coating of ethyl silicate has a higher coefficient of friction than the first resin coating.

The ethyl silicate impregnated sheet may then be bonded to the metal clutch plate or band. A suitable adhesive cement, such as a phenol formaldehyde described in the above mentioned U.S. Pat. No. 2,819,987, is applied to the steel clutch plate or band and the cut sheet of friction facing is pressed onto the cemented plate. The bonding process may be accomplished by several methods at temperatures of from 300° to 460° F. In one method, the assembly is secured in a spring loaded fixture, placed in a forced air oven and heated to 300° F for about 1 ½ hours. This lower temperature, longer time method is employed when the paper type friction lining is used in transmissions or clutches in combination with alternate ring facings containing a material such as cork, which would be affected by higher temperatures. In a higher temperature, shorter time bonding process, friction facings are positioned on both sides of a steel core or band and placed in a mold or on a hot platen. The assembly is enclosed under load by air or hydraulic cylinders and heated at temperatures of from 400° to 460° F for from 1 to 5 minutes. The assembly can also be placed in molds of pre-set thickness which are held in a spring loaded fixture and placed on a conveyor which passes through an oven at temperatures of from 300° to 460° F. The bonding action is determined by the amount of heat applied for a given time and this also aids the completion of the curing or setting of the ethyl silicate binder impregnant.

In an alternative method, the paper-like sheet is first cut to size and bonded to the metal plates or bands and then the entire assembly is dipped into the solution and impregnated with ethyl silicate. The impregnated sheet and metal plate are cured further in a forced air oven at 300° to 350° F for 5 to 20 minutes, depending upon the size of the components. The coating of the steel plate is also beneficial in retarding rust.

As discussed above, the grooves 16 in the lining provide cooling and improved friction properties. The grooves allow oil flow across the facing material and break the oil film on the engaging metal plate members of the transmission or clutch. In the past, these grooves have had to be ground into hard asbestos type resin impregnated linings. The formation of such grooves in the present softer paper-type lining is performed much more readily. This may also be done by grinding, but is now preferably done by coining the grooves under pressure and heat into the softer material after the curing of the resin coating. The grooves are then set in the desired shape and dimension by the subsequent impregnation with ethyl silicate.

Test results of the present friction facings having an outer coating of ethyl silicate for use on clutch plates, in comparison with standard available facings with outer coatings of phenolic resin have shown from 30 to 50% less wear after 1000 to 2000 cycles of on and off operation under load. Dynamic and static measurements of the coefficient of friction show an increase of about 10% over resin coated types. For example, readings of 0.110 and 0.121 were obtained for the dynamic and static coefficients of the resin types, while 0.125 and 0.136 were obtained respectively for the coefficients of friction of the ethyl silicate coating. This is considered a significant improvement and is accompanied by larger improvements in other related properties. Durability tests of transmission bands with the ethyl silicate coated friction facing have shown a more than ten fold improvement over standard resin coated types. These tests included 600 cycles of shifting from reverse to neutral to drive, and back, at an equivalent of 35 miles per hour. Resin types failed after 30 to 40 cycles, while the ethyl silicate types continued through the full 600 cycles.

The present invention thus provides a novel significantly improved friction facing material which operates in a fluid or oil environment and has desirable wear, durability, friction and heat resistant properties while permitting the elimination of asbestos. While several embodiments have been described or illustrated, it is apparent that other variations may be made in the particular configuration and method without departing from the scope of the invention as set forth in the appended claims.

What is claimed is:
1. A friction facing comprising a porous sheet base material including cellulose fibers, an inorganic absorbent filler, and a retention agent in a proportion throughout said base of up to 13% by weight of said base for holding said porous sheet base material together; a first coating of a resin binder impregnant on said porous sheet base, and a second outer coating of an ethyl silicate binder impregnant on said resin coating, said base with said coatings being porous and absorbent.
2. The friction facing of claim 1 wherein said porous sheet base material includes a heat resistant friction modifying agent.
3. The friction facing of claim 2 wherein said resin binder impregnant is a phenol formaldehyde.
4. The friction facing of claim 3 wherein said outer coating has a coefficient of friction of at least 5% higher than said first coating.
5. The friction facing of claim 4 wherein said heat resistant friction modifying agent is selected form the group consisting of black iron oxide, red iron oxide, mica flake, chrome oxide and carbon black.
6. The friction facing of claim 4 wherein said retention agent is cationic.
7. The friction facing of claim 5 wherein said cellulose fibers are selected from the group consisting of kraft and cotton linters.
8. The friction facing of claim 7 wherein said filler is diatomaceous earth.
9. The friction facing of claim 2 wherein said porous sheet base material excludes asbestos.
10. The friction facing of claim 2 wherein said porous sheet face having said coatings is bonded to a metal base plate.
11. The friction facing of claim 10 wherein said metal base plate and porous base have a coating of said ethyl silicate.
12. The friction facing of claim 4 wherein said resin coating adds from 10 to 40% of the weight of said base, said retention agent is from 0.5 to 13% by weight of said base, and said ethyl silicate coating adds from 5 to 50% by weight of silica to said resin coated base.
13. The friction facing of claim 4 said retention agent is selected from the group consisting of nitrile latex, paper makers alum, melamine formaldehyde, a polymeric thixotropic agent, poly acrylamide resin and polyamide resin.

* * * * *